Nov. 27, 1951     D. J. PEEPS     2,576,638
PAN GREASING MACHINE

Filed June 28, 1950     5 Sheets-Sheet 1

Fig. I

INVENTOR
DONALD J. PEEPS
BY W. P. Carr
ATTORNEY

Nov. 27, 1951     D. J. PEEPS     2,576,638
PAN GREASING MACHINE

Filed June 28, 1950     5 Sheets-Sheet 2

INVENTOR
DONALD J. PEEPS
BY W. P. Carr
ATTORNEY

Nov. 27, 1951    D. J. PEEPS    2,576,638
PAN GREASING MACHINE
Filed June 28, 1950    5 Sheets-Sheet 3

INVENTOR
DONALD J. PEEPS
BY W. P. Carr
ATTORNEY

Nov. 27, 1951     D. J. PEEPS     2,576,638

PAN GREASING MACHINE

Filed June 28, 1950     5 Sheets-Sheet 4

INVENTOR
DONALD J. PEEPS
BY W. P. Carr
ATTORNEY

Nov. 27, 1951     D. J. PEEPS     2,576,638
PAN GREASING MACHINE
Filed June 28, 1950     5 Sheets-Sheet 5
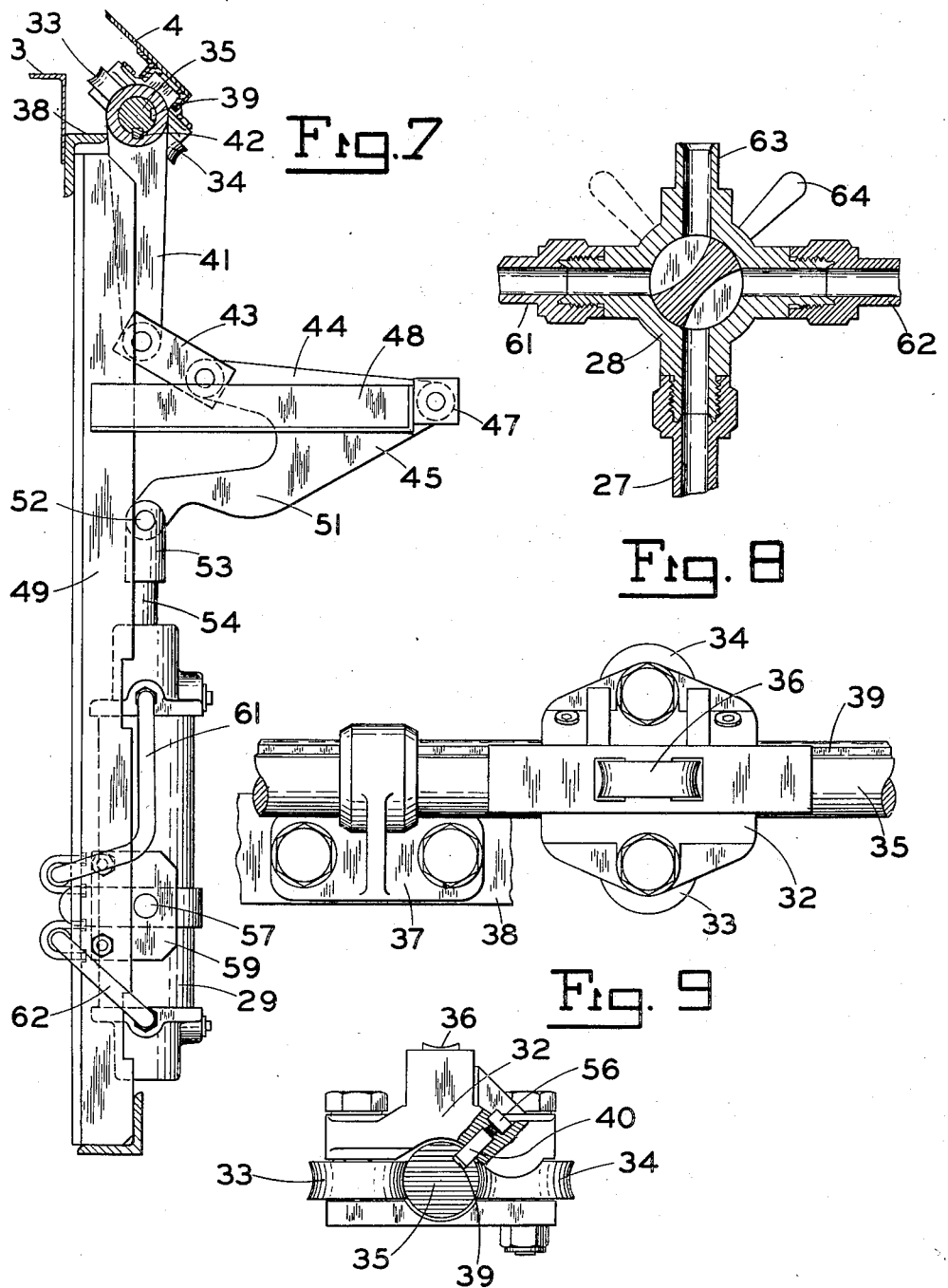
INVENTOR
DONALD J. PEEPS
BY W. P. Carr
ATTORNEY Patented Nov. 27, 1951

2,576,638

UNITED STATES PATENT OFFICE 2,576,638

PAN GREASING MACHINE

Donald J. Peeps, Toledo, Ohio, assignor to The De Vilbiss Company, Toledo, Ohio, a corporation of Ohio Application June 28, 1950, Serial No. 170,885

5 Claims. (Cl. 91—45)

This invention relates to a pan greasing machine for automatically applying grease to the inner surfaces of cake pans. In such machines cake pans of multiple cavity form are usually set in inverted position in an opening of a movable carriage which is reciprocated over a spraying station. Because of the accumulation of grease upon the carriage and other parts of the machine it is very desirable that the carriage be so mounted that it may be tilted upwardly out of its normal horizontal position. In this manner the underside of the carriage and the upper surfaces of the table upon which it reciprocates may be easily reached for cleaning.

This invention relates to a machine of the general design and operation as that described in U. S. Patent 2,350,708. However, in this earlier design the carriage is tiltable only with the table top upon which it reciprocates. This assembly is heavy and is accordingly hard to raise and may cause serious injury should it drop unexpectedly.

One object of the present invention is to provide a carriage which alone is tiltable.

A further object is the provision of means for raising and locking the carriage in its raised position.

Another object of the invention is to provide simple reliable means for effecting the spray discharge in proper synchronism with the carriage movement.

These and other objects and advantages will become more apparent with reference given to the following specification and the accompanying drawings in which:

Fig. 7 is a side elevation of the carriage hinge and tilting mechanism with the carriage in tilted position.

Fig. 8 is a vertical section of the valve controlling the flow of air to the carriage tilting air piston;

Fig. 9 is a fragmentary plan view of the shaft upon which the carriage is pivoted, a shaft supporting bracket, and the carriage roller assembly providing transverse mobility of the carriage upon the shaft; and Fig. 10 is an end view of the roller assembly with a portion broken away to show the key projecting from the assembly into a groove of the shaft for providing the pivoting connection between the shaft and roller assembly.

Figure 1:
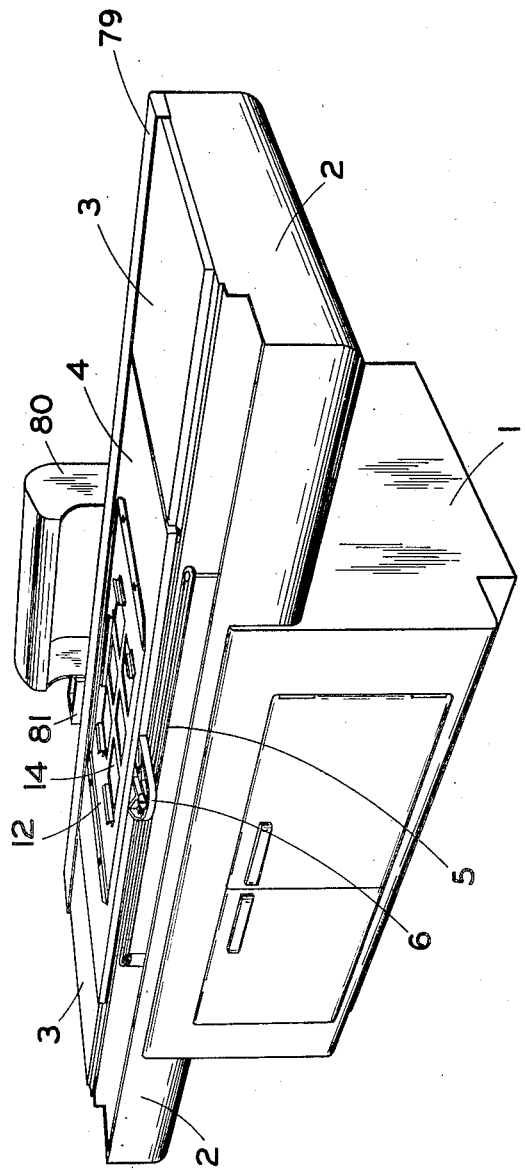
Fig. 1 is a front perspective view of a pan greasing machine embodying my invention.
Figure 2:
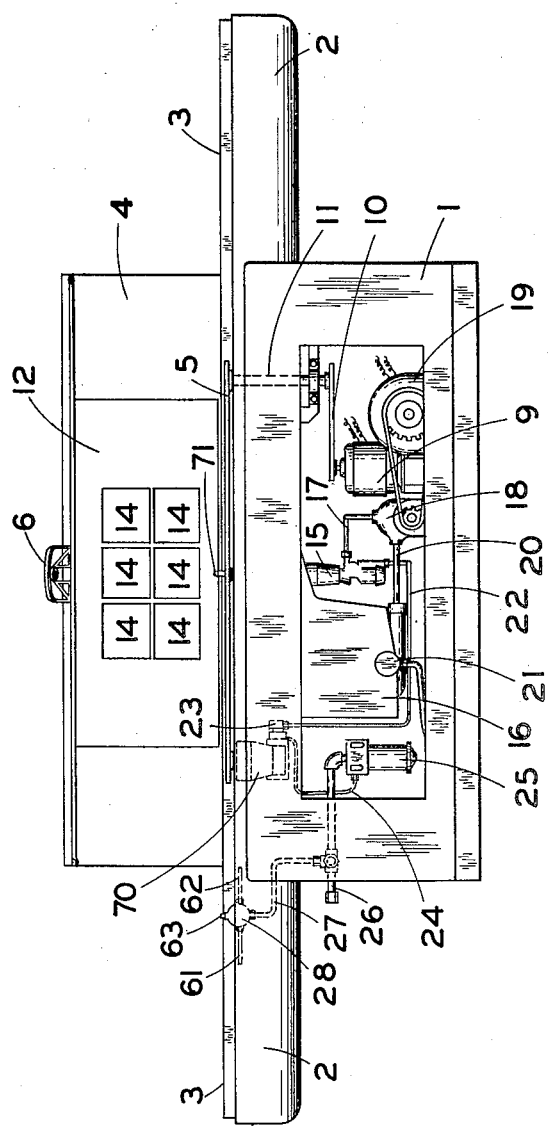
Fig. 2 is front elevation thereof with the carriage in raised position and the doors removed from the base housing.

Referring in detail to the drawings, in Figs. 1 and 2 the present embodiment of the invention is illustrated as having a lower supporting casing 1 which constitutes a housing for operational motors and associated mechanisms. Upon the casing 1 and extending from each end is table supporting structure 2. Reciprocably mounted over the table 3 is carriage 4. This is reciprocated through the driving connection between chain 5 and bracket 6 integral with the carriage 4. The chain 5 is mounted upon a driving sprocket 7 and an idler sprocket 8. A motor 9 within the casing 1 is actuatingly connected with the driving sprocket 7 through chain 10 and axle 11.

To accommodate various designs of pan sets, replaceable shield members such as 12 are secured by eccentric headed turn bolts 13 to a rectangular opening in the carriage 4. The shield 12 has openings 14 adapted to outline the cavities of the cake pans to be coated. Up through these openings 14 the spray of grease reaches the pan cavities from spray guns 15 with discharge outlets within the open topped sump 16.

The spray guns extend downwardly and exteriorally from the sump 16. The grease reaches the spray guns 15, only one of which is shown, through a conduit 17 from a pump 18. The latter is driven by a motor 19. The main supply of the grease is originally placed within the sump and is drawn therefrom by the pump 18 through conduit 20. An electric heater 21 extends into the sump 16 to maintain the circulating grease at a proper spraying consistency.

Air for atomizing the grease reaches the spray guns 15 through conduit 22. The flow of air therethrough is controlled by valve 23. The air reaches the valve through conduit 24 from the air cleaner and regulator 25. Piping 26 connected to the air cleaner and regulator 25 brings in the air from the outside supply source. Connected to the piping 26 is tubing 27 which runs to four-way valve 28, a section of which appears in Fig. 8. This hand valve controls the air flow to an air cylinder 29 (Figs. 5, 6 and 7) on the rear side of the machine which is actuatingly associated with the carriage for tilting the latter.

The carriage 4 is supported along its forward edge by rollers 30 which ride upon a flat bar 31 fixed to frame members of the casing 1 and table 3. Integral with the rear edge of the carriage 4 are supporting roller assemblies 32 (Figs. 7, 9 and 10). Each roller assembly includes two concave faced rollers 33 and 34 with normally vertical axes which ride against opposite sides of shaft 35. The assembly 32 also includes a roller 36 with a normally horizontal axis which rides along the upper surface of shaft 35. This shaft is held in position by brackets 37 fixed to a horizontal frame member 38 of the machine. The brackets 37 have a bearing contact with the shaft 35 permitting the latter to be turned upon its longitudinal axis.

The shaft 35 has a lengthwise groove or key way 39 within which a key 40 held by a bolt 56 in each roller assembly 32 has a sliding fit.

A lever 41 is fixed at its upper end upon shaft 35 by key 42 and associated grooves in the lever and shaft. The lower end of the lever 41 is fastened, through link 43, to the upper arm 44 of a rocker beam 45. The latter is oscillatably mounted through a trunnion axle portion 46 upon bearings 47. The bearings 47 are secured upon the outer ends of companion angle irons 48 extending rearwardly from upright machine frame members 49 and 50 to which the angle irons 48 are respectively welded. The lower arm 51 of the rocker beam 45 has a knuckle joint through a pin 52 with the yoke ended collar 53 fixed to the end of piston rod 54. The air piston 55 is lodged within cylinder 29 which is supported upon trunnions 57 and 58 bearing in plates 59 and 60 which in turn are bolted to upright frame members 49 and 50.

Piston motivating air is delivered to and vented from opposite ends of the cylinder through tubings 61 and 62. As shown in Fig. 8 these tubings are connected to 4-way valve 28 which is mounted for convenient manual operation on the left hand side of the front of the machine as may be seen in Fig. 2.

Figures 5, 6:
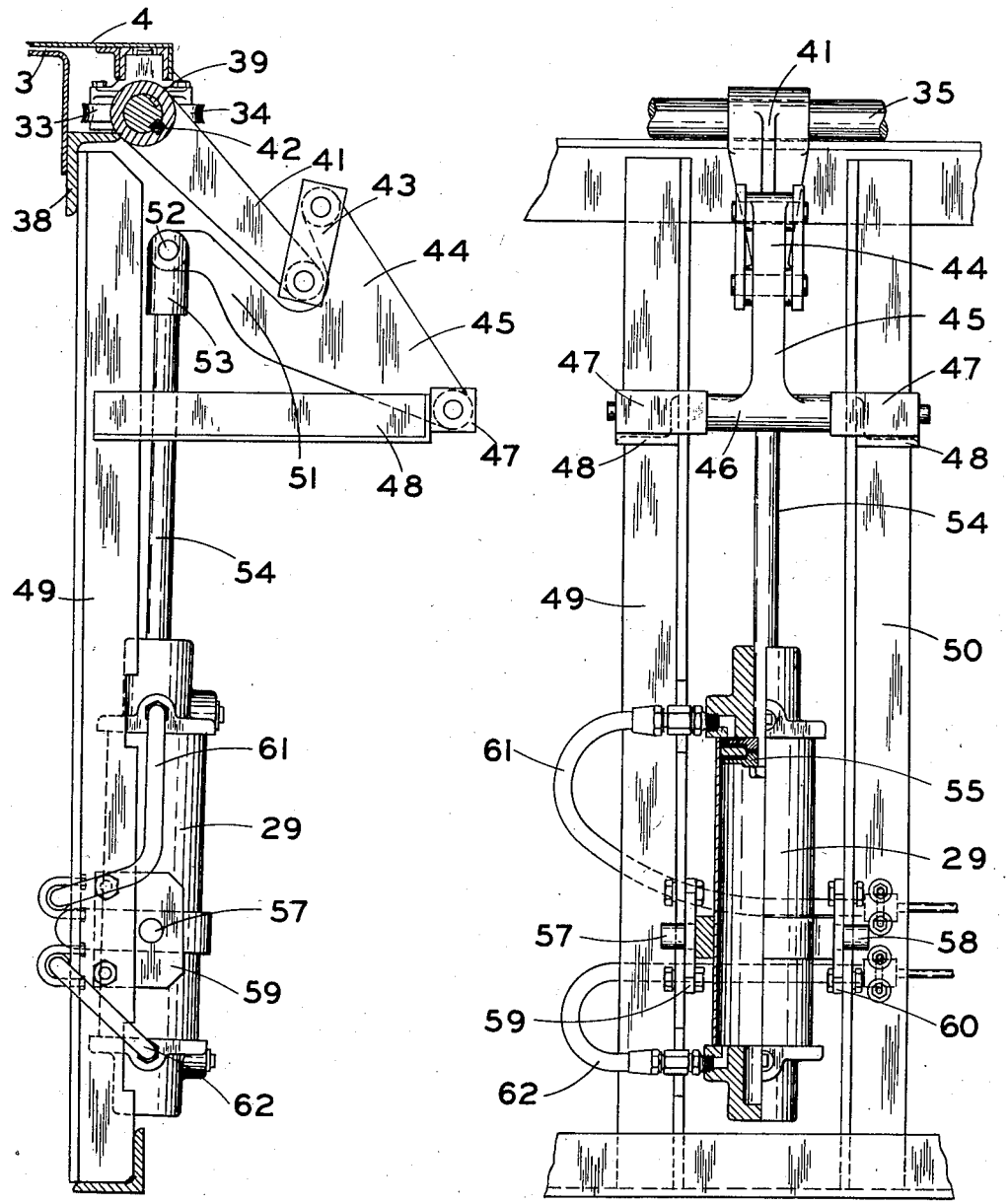
Fig. 5 is a side elevation of the carriage hinge and tilting mechanism with the carriage in its lowered position.
Fig. 6 is a rear elevation of the same elements with parts in section.

With the valve 28 in the position shown in Fig. 8 air from above the piston is vented to the atmosphere through nipple 63 and air under pressure is delivered to the air cylinder 29 beneath the piston 55 through tubing 62. Under these conditions the piston 55 is forced to its uppermost position with the piston rod 54, lever 41, link 43 and rocker beam 45 positioned as shown in Figs. 5 and 6. With these parts so placed the carriage 4 is in its normal lowered position with the bracket 6 in engagement with the carriage driving chain 5.

When it is desired, after an operating period of cake pan coating, to tilt the carriage for cleaning purposes the handle 64 of the valve 28 is swung to the dotted position shown in Fig. 8. The air below the piston will thus be released through tubing 62 and vent nipple 63, and air under pressure is admitted to the cylinder, through tubing 61, above the piston and drives it downwardly to the other end of the cylinder. When this occurs, as illustrated in Fig. 7, rocker beam 45, through its connection by collar yoke 53 with the end of the piston rod 54, is pivoted downwardly and lever 41 is turned clockwise through link 43. As lever 41 is fixed to shaft 35 the latter is rotated by this lever movement. Through the keyed connection of the shaft 35 with the carriage roller assemblies 32, the turning of shaft 35 tilts the carriage to its raised position as indicated in Fig. 7 and shown more fully in Fig. 2.

Because of the relative positions and interaction of lever 41, link 43 and rocker beam 45 as viewed in Fig. 7, the carriage 4 is locked in raised position and may not be lowered manually or through its own weight. This is due to the fact that rocker beam 45 is prevented from any further downward movement because of the piston being imposed against the lower end of the cylinder. Accordingly, any downward thrust of the carriage is balked, as the joint between link 43 and lever 41 forms an angle which cannot be straightened out due to the fixed distance between the outer end of upper arm 44 of the rocker beam and the turning axis (the center line of shaft 35) of lever 41. Consequently, downward movement of the carriage may be secured only through upward movement of the piston as controlled by air flow from four-way valve 28.

The locking effect does not interfere with the lowering of the carriage through upward movement of the air piston. As the rocker beam 45 is pivoted upwardly the link 43 is first brought into substantially a horizontal position by forcing a slight further clockwise movement of lever 41. With further upward movement of beam 45 lever 41 is moved in a counter clockwise direction until the carriage reaches its down position.

In order to prevent too rapid downward movement of the carriage suitable spring or shock absorber mechanism may be connected to beam 45. The lowering speed of the carriage may also be slackened by a slow manipulation of the valve 28.

Figure 3:
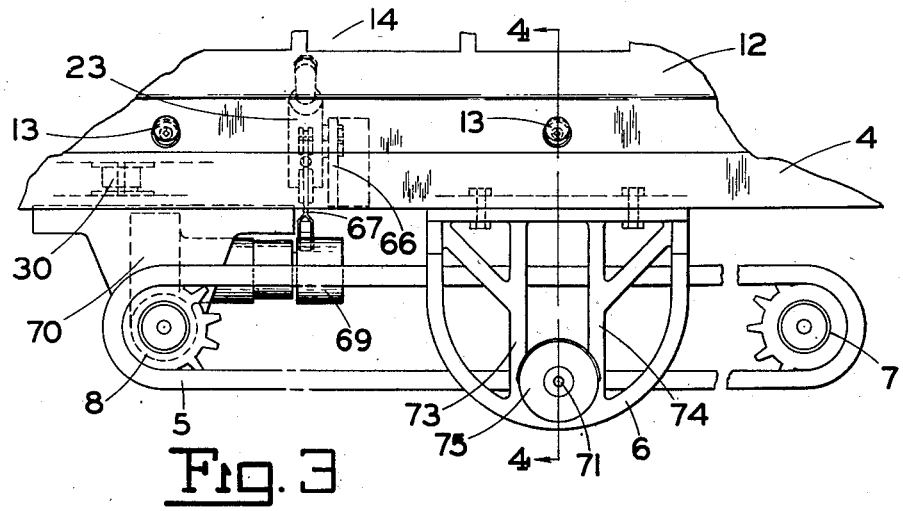
Fig. 3 is a fragmentary plan view of the pan carriage and its reciprocating driving means.
Figure 4:
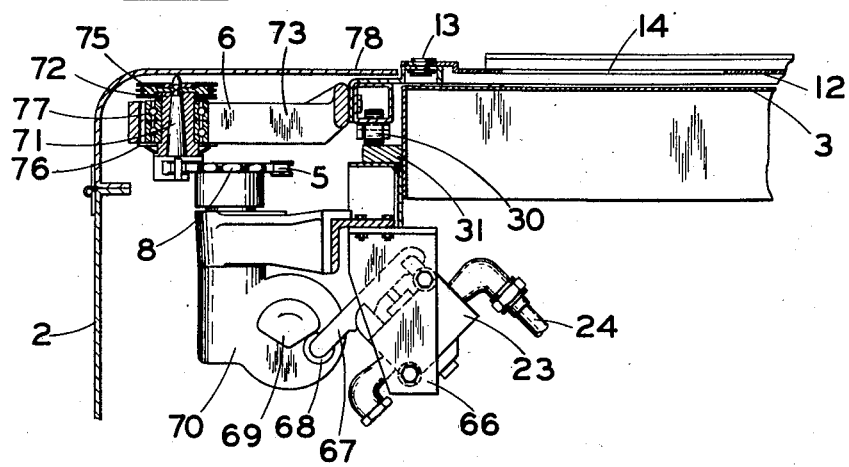
Fig. 4 is a fragmentary vertical section taken on the line 4—4 of Fig. 3.

As may be seen in Figs. 3 and 4 valve 23 is fastened to a bracket 66 secured to a frame member of the machine. A pivoted valve actuating arm 67 has a roller 68 on its end through which the arm is depressed by rotating cam 69. The latter is mounted on a shaft extending from speed reducing gear assembly 70. The driving power for the cam is secured from the shaft of idler sprocket 8 and the gear ratio is used which causes the air valve 23 to be actuated and the spray guns to be operated only when the pan shield 12 is passing over the sump during the travel of the carriage 4 to the left when viewing the machine from the front thereof. During the return of the carriage to the right the valve remains closed and the spray guns accordingly inoperative.

In Figs. 3 and 4 the driving connection between the chain 5 and the carriage is more fully disclosed. A tapered driving pin 71 fixed to the chain fits within a similarly tapered opening in a hub 72. The latter is held within the cross opening in the bracket 6 formed by ways 73 and 74 by discs 75 and 76 fastened to the ends of hub. Bearing assemblies 77 around the hub 72 afford the driving contact between the chain and the carriage as they bear against the ways 73 and 74 between which they ride as the pin 71 turns about the sprockets 7 and 8.

When the machine is being operated it is advisable to have a cover 78, as shown in Fig. 4, over the driving mechanism to keep the latter from being coated with grease. A similar hinged cover 79 is shown in Fig. 1 along the rear edge of the machine. At the center of the back of the machine is a small exhaust canopy 80 through which spray fumes are drawn for discharge through an exhaust stack, the lower portion of which is indicated at 81.

Having thus described my invention, what I claim as new, and desire to secure by United States Letters Patent, is:

1. In a pan greasing machine a reciprocably mounted pan carriage, means for reciprocating said carriage, an axially turnable shaft mounted along one edge of said carriage, means fixedly attached to said carriage and having encompassing longitudinally sliding contact with said shaft, means for axially turning said shaft and catch means between the shaft and the carriage whereby the carriage is tilted upwardly on the axis of the shaft when the latter is axially turned.

2. A pan greasing machine as set forth in claim 1 in which the catch means includes a longitudinal groove in the shaft and a key extending from the carriage into the groove.

3. In a pan greasing machine a normally horizontal carriage for supporting the pans to be greased, a shaft along the rear edge of the carriage to which the carriage is latched, mounting for said shaft permitting axial turning thereof for tilting the carriage, a vertical air cylinder positioned below said shaft, an air piston at the upper end of said cylinder when the carriage is in horizontal position, connections for delivering compressed air alternately to opposite ends of the cylinder, a piston rod extending upwardly from said cylinder, a lever fixed to said shaft and extending at an angle rearwardly and downwardly therefrom when the carriage is in a horizontal position, a bell crank beam pivoted on an axis located rearwardly of the shaft at a level midway between the top of the cylinder and the shaft and substantially in line longitudinally of the lever when the carriage is in a horizontal position, one arm of the beam extending above the outer end of the lever when the carriage is in horizontal position, a link joining the ends of said arm and lever, and a second arm of the beam extending below the lever and pivotally joined to the end of the piston rod, the various elements being so dimensioned that when the piston is moved by air pressure to its lowermost position, the lever is brought downwardly to a substantially vertical position tilting the carriage upwardly, the upper arm of the beam is swung to a substantially horizontal stopped position and the link joining the lever to the upper arm is angled downwardly from the end of the lever to the end of the upper arm, and return movement of the lever through the weight of the carriage is prevented as the straightening of the link in line with the lever necessary for such movement is not possible with the upper arm of the beam held against any further downward motion.

4. In a pan greasing machine a reciprocable pan carriage, a spray gun stationed to coat pans carried by said carriage, an endless chain having a driving connection with said carriage, a driven sprocket and an idler sprocket upon which the chain is mounted, vertically depending shafts for said sprockets, driving means actuatingly connected to the shaft of the driven sprocket for reciprocating said carriage, a speed reducing gear assembly geared to one of said shafts, a rotating cam driven by said gear assembly, an air valve positioned adjacent the gear assembly for controlling the flow of operating air to the spray gun, and an air valve motivating lever in following contact with said cam for periodic actuation thereby to operate the spray gun in predetermined relation to the carriage reciprocation.

5. In a pan greasing machine a reciprocably mounted pan carriage, means for reciprocating said carriage, rollers along the forward edge of the carriage on which the carriage is supported in its reciprocating motion, supporting roller assemblies fixed to the rearward edge of said carriage including opposed rollers upon normally vertical axes and an upper roller upon a normally horizontal axis, a shaft supported along the rearward edge of the carriage and against the sides and top of which the rollers of the roller assemblies ride, means for turning said shaft upon its longitudinal axis, and catch means between the shaft and the carriage whereby the latter is tilted upon the axis of the shaft when the shaft is turned.

DONALD J. PEEPS.

REFERENCES CITED

The following references are of record in the file of this patent:

UNITED STATES PATENTS

| Number | Name | Date |
|---|---|---|
| 1,608,810 | Rasmussen et al. | Nov. 30, 1926 |
| 1,741,155 | Hatch | Dec. 31, 1929 |
| 2,350,708 | Roselund | June 6, 1944 |
| 2,499,621 | Archer | Mar. 7, 1950 |